US012356441B2

United States Patent
Eleftheriadis et al.

(10) Patent No.: US 12,356,441 B2
(45) Date of Patent: Jul. 8, 2025

(54) CONTROLLING TRAFFIC AND INTERFERENCE IN A COMMUNICATIONS NETWORK

(71) Applicant: Telefonaktiebolaget LM Ericsson (PUBL), Stockholm (SE)

(72) Inventors: Lackis Eleftheriadis, Valbo (SE); Athanasios Karapantelakis, Solna (SE); Gaurav Dixit, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 558 days.

(21) Appl. No.: 17/765,060

(22) PCT Filed: Sep. 30, 2019

(86) PCT No.: PCT/EP2019/076393
§ 371 (c)(1),
(2) Date: Mar. 30, 2022

(87) PCT Pub. No.: WO2021/063474
PCT Pub. Date: Apr. 8, 2021

(65) Prior Publication Data
US 2022/0346108 A1 Oct. 27, 2022

(51) Int. Cl.
*H04W 72/54* (2023.01)
*H04W 28/02* (2009.01)
(Continued)

(52) U.S. Cl.
CPC ....... *H04W 72/54* (2023.01); *H04W 28/0226* (2013.01); *H04W 28/0268* (2013.01); *H04W 72/121* (2013.01); *H04W 72/56* (2023.01)

(58) Field of Classification Search
None
See application file for complete search history.

(56) References Cited

U.S. PATENT DOCUMENTS 8,243,689 B2   8/2012 Youn et al.
8,644,154 B2   2/2014 Vivanco et al.
(Continued)

FOREIGN PATENT DOCUMENTS

CN   102440054 A   5/2012
CN   105684546 A   6/2016
(Continued)

OTHER PUBLICATIONS

PCT Notification of Transmittal of the International Search Report and the Written Opinion of the International Searching Authority, or the Declaration issued for International application No. PCT/EP2019/076393—Jun. 12, 2020.
(Continued)

*Primary Examiner* — Mohammad S Adhami
(74) *Attorney, Agent, or Firm* — Baker Botts L.L.P.

(57) ABSTRACT

Methods, nodes, computer programs and communication networks are disclosed. The disclosure provides a method performed by a network node for controlling traffic in a communications network, the communications network comprising a wireless access node adapted to serve a plurality of wireless devices. The method comprises obtaining network operation data for at least one of the plurality of wireless devices, the network operation data comprising location of the respective wireless device and performance data correlated with the location, the network operation data being indicative of a plurality of attributes corresponding to the operation of the respective wireless device in the communications network. The method also comprises grouping the at least one wireless device of the plurality of wireless devices by partitioning the network operation data into one or more service clusters wherein each service cluster defines a geographical area based on the obtained location. The method also comprises scheduling network traffic between (Continued)

the wireless access node and at least one wireless device depending on the location of the at least one wireless device relative to the one or more service clusters.

17 Claims, 11 Drawing Sheets

(51) Int. Cl.
*H04W 72/121* (2023.01)
*H04W 72/56* (2023.01)

(56) References Cited

U.S. PATENT DOCUMENTS

| | | | |
|---|---|---|---|
| 9,414,222 B1 | 8/2016 | Dixon | |
| 9,578,495 B2 | 2/2017 | Xiang et al. | |
| 10,306,656 B2 | 5/2019 | Zhu et al. | |
| 10,321,401 B2 | 6/2019 | Li et al. | |
| 2015/0146689 A1* | 5/2015 | Fu | H04J 3/0632 370/331 |
| 2016/0021173 A1 | 1/2016 | Tapia | |
| 2016/0119941 A1 | 4/2016 | Ko et al. | |
| 2018/0035336 A1 | 2/2018 | Wang et al. | |
| 2019/0068443 A1* | 2/2019 | Li | H04L 41/0823 |
| 2019/0223140 A1* | 7/2019 | Grossmann | G01S 5/02585 |
| 2019/0342061 A1 | 11/2019 | Kim et al. | |
| 2020/0021952 A1* | 1/2020 | Koudouridis | H04W 72/542 |
| 2020/0145175 A1* | 5/2020 | Hassan Hussein | H04W 72/541 |
| 2020/0280521 A1* | 9/2020 | Cao | H04W 28/0967 |

FOREIGN PATENT DOCUMENTS

| | | |
|---|---|---|
| CN | 107241790 A | 10/2017 |
| CN | 108153830 A | 6/2018 |
| CN | 108432323 A | 8/2018 |
| EP | 2 858 291 B1 | 6/2017 |
| EP | 3 404 985 A1 | 11/2018 |
| WO | 2009 152097 A1 | 12/2009 |
| WO | 2018 021825 A1 | 2/2018 |
| WO | 2018 031327 A1 | 2/2018 |

OTHER PUBLICATIONS

Notice of First Review issued for Chinese Patent Application Serial No. 201980100887.2—Oct. 25, 2024.
Zhou Jia et al. "Uplink Pilot Design in Massive MIMO Systems", Jan. 24, 2018.

* cited by examiner

CONTROLLING TRAFFIC AND INTERFERENCE IN A COMMUNICATIONS NETWORK

PRIORITY

This nonprovisional application is a U.S. National Stage Filing under 35 U.S.C. § 371 of International Patent Application Serial No. PCT/EP2019/076393 filed Sep. 30, 2019 and entitled "CONTROLLING TRAFFIC AND INTERFERENCE IN A COMMUNICATIONS NETWORK, which is hereby incorporated by reference in its entirety.

TECHNICAL FIELD

The disclosure relates to methods, nodes, computer programs and communication networks. More particularly, but non-exclusively, the disclosure relates to controlling traffic and interference mitigation in a communications network.

BACKGROUND

A communications network is a collection of nodes in which links are connected so as to enable transmission of information between the nodes. A specific example of communications network is a cellular or mobile network, in which the last link is wireless. The cellular network may be distributed over geographical zones called "cells", each served by at least one wireless transceiver or wireless access node. These transceivers provide the cell with the network coverage which can be used for transmission of voice, data, and other types of content to and from wireless devices such as mobile terminals.

One of the problems experienced in communications networks is interference. Interference can modify a signal in a disruptive manner, as it travels along a channel between a source and receiver. In wireless communications networks, wireless signals may be communicated between a wireless terminal and a wireless transceiver. Interference in cellular or mobile networks can have unwanted consequences both to users of the network and the network operator. For users of wireless terminals, interference can degrade the Quality of Service, QoS or Quality of Experience, QoE which may manifest itself by reduced channel bandwidth, reduced channel throughput or increased session and call drop rate, for example.

In cellular networks, interference may often be observed close to edges of the cell and may depend on a number of active neighbouring wireless devices, interference between neighbouring wireless access nodes and type and volume of data processed by the wireless devices, for example. It is not uncommon also to observe interference in tunnels and inside buildings.

One of the ways to reduce effects of interference and to maintain QoS and QoE in cellular networks, is to increase transmission, Tx downlink power of a radio signal transmitted from a wireless base station or a wireless access node. At the same time, the uplink power of a radio signal from the wireless terminal being served by that wireless access node also increases. This may lead to increased battery consumption of the wireless terminal and increased energy usage of the wireless base station.

In Fifth-Generation New Radio, 5G NR networks, it is possible to reduce effects of interference by allocating a wireless device called User Equipment, UE to a Primary Cell, PCell where the UE operates at first frequency, or to a Secondary Cell, SCell where the UE operates at a second frequency. Alternatively, UE in 5G networks can be configured to operate in dual bands. When one carrier is disturbed, then the UE or wireless base station can allocate data to the other carrier within the cell coverage area.

With growing number of deployments of newer generation networks, such as 5G mobile networks, a number of physical sites will also increase. The 5G network infrastructure may include both macro cells providing large coverage and requiring more powerful and efficient wireless transceivers, as well as small cells covering smaller areas. An overall increase of physical network nodes leads to overlapping cell coverages. This situation will demand careful consideration from the network operation perspective, as there is a growing need to optimize energy usage and manage interference in an effective way, whilst minimizing impact on QoS and QoE of the network users.

WO 2009/152097 A1 describes wireless communication devices, and more particularly, apparatus and methods for generating performance measurements in wireless networks.

SUMMARY

The object of the present invention is therefore to propose a solution to problems resulting from interference and increased energy usage in communications networks.

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

One aspect of the present disclosure provides a method performed by a network node for controlling traffic in a communications network, the communications network comprising a wireless access node adapted to serve a plurality of wireless devices. The method comprises obtaining network operation data for at least one of the plurality of wireless devices, the network operation data comprising location of the respective wireless device and performance data correlated with the location, the network operation data being indicative of a plurality of attributes corresponding to the operation of the respective wireless device in the communications network. The method also comprises grouping the at least one wireless device of the plurality of wireless devices by partitioning the network operation data into one or more service clusters wherein each service cluster defines a geographical area based on the obtained location. The method also comprises scheduling network traffic between the wireless access node and at least one wireless device depending on the location of the at least one wireless device relative to the one or more service clusters.

A further aspect of the present disclosure provides a network node of a communication network, the communications network comprising a wireless access node adapted to serve a plurality of wireless devices. The network node comprises processing circuitry and a memory containing instructions executable by the processing circuitry, whereby the network node is operable to obtain network operation data for at least one of the plurality of wireless devices, the network operation data comprising location of the respective wireless device and performance data correlated with the location, the network operation data being indicative of a plurality of attributes corresponding to the operation of the respective wireless device in the communications network.

The network node is further operable to group the at least one wireless device of the plurality of wireless devices by partitioning the network operation data into one or more service clusters wherein each service cluster defines a geographical area based on the obtained location. The network node is further operable to schedule network traffic between the wireless access node and at least one wireless device depending on the location of the at least one wireless device relative to the one or more service clusters.

Yet another aspect of the present disclosure provides a computer program for controlling traffic in a communications network, the computer program comprising computer code which, when run on processing circuitry of a network node, causes the network node to obtain network operation data for at least one of the plurality of wireless devices, the network operation data comprising location of the respective wireless device and performance data correlated with the location, the network operation data being indicative of a plurality of attributes corresponding to the operation of the respective wireless device in the communications network. The computer code further causes the network node to group the at least one wireless device of the plurality of wireless devices by partitioning the network operation data into one or more service clusters wherein each service cluster defines a geographical area based on the obtained location. The computer code further causes the network node to schedule network traffic between the wireless access node and at least one wireless device depending on the location of the at least one wireless device relative to the one or more service clusters.

Yet another aspect of the present disclosure provides a communications network. The communications network comprises a first wireless access node and second wireless access node wherein the first and second access nodes are adapted to serve a plurality of wireless devices. The communications network further comprises a computer program according to another aspect. The computer program comprises computer code which, when run on processing circuitry of the first wireless access node, causes the first and second wireless access node to approximate the location of the at least one wireless device based on a control plane reference signal and data plane reference signal received by the respective wireless device. The control plane reference signal originates at the first wireless access node and the data plane reference signal originates at the second wireless access node.

Advantageously, embodiments of the present invention allow identification of geographical areas with high interference and power usage and which are not optimized in relation to power consumption and mobility of the wireless devices.

As another advantage, embodiments of the present invention allow assigning different capabilities to service clusters, such as as low power consumption, best throughput, QoS, and on that basis perform optimized, improved and intelligent scheduling and control of network traffic data communicated between the wireless devices and wireless access nodes.

Yet further advantage of the embodiments of the present invention is lowering power consumption and improving network energy performance from the UE perspective and network perspective.

Another advantage of the embodiments of the present invention is improved network planning, for example by Field Service Operations, FSO engineer or Network Operations Centre, NOC person, when using the embodiments of the present invention.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general-purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor, DSP hardware, a reduced instruction set processor, hardware (e.g., digital or analogue) circuitry including but not limited to application specific integrated circuit(s), ASIC and/or field programmable gate array(s), FPGA(s), and (where appropriate) state machines capable of performing such functions.

Figure 1:
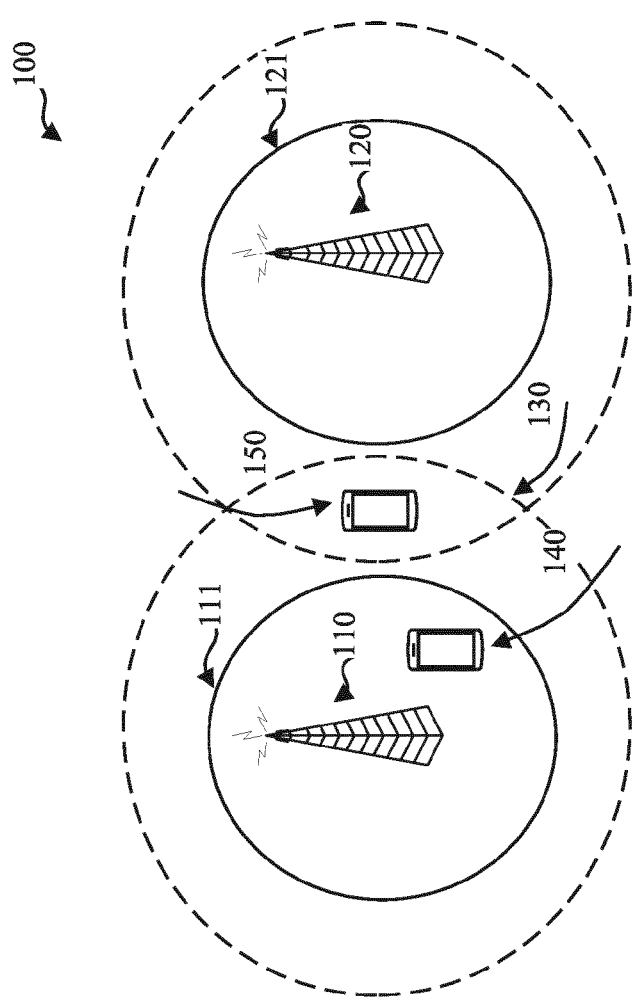
FIG. 1 is a schematic of an example of a communications network.

FIG. 1 illustrates an example of a wireless communications network 100, which may be a 5G NR network. The wireless communications network 100 may comprise a first wireless access node 110 and second wireless access node 120, such as Evolved-NodeB, eNB or Next Generation NodeB, gNB. Both the first and second wireless access nodes 110, 120 have respective radio coverage areas 111 and 121 which may correspond to the geographical extent of the cells served by the respective nodes 110, 120. With multiple cells 111, 121 typically present in the wireless communication network 100, there is often an overlap zone 130 between neighbouring cells 111, 121.

The first and second wireless access nodes 110 and 120 may be serving at least one wireless device 140, 150 such as UE 140, 150. For a first UE 140 which is located in the first cell 111 and not far away from the first wireless access node 110, the interference from different radio signals may be low and the first wireless access node radio output power is also low. For a second UE 150 located in the overlap zone 130 at the edges of the cells 111 and 121, where radio signals from both the first and second wireless access nodes 110, 120 are present, the experienced interference resulting from these signals affecting each other may be high, and the radio output power of the first and second wireless access nodes may also be high due to their attempt of establishing a reliable communication with the second UE 150. This situation often causes degradation of QoS and QoE for the UE 150.

Figure 2:
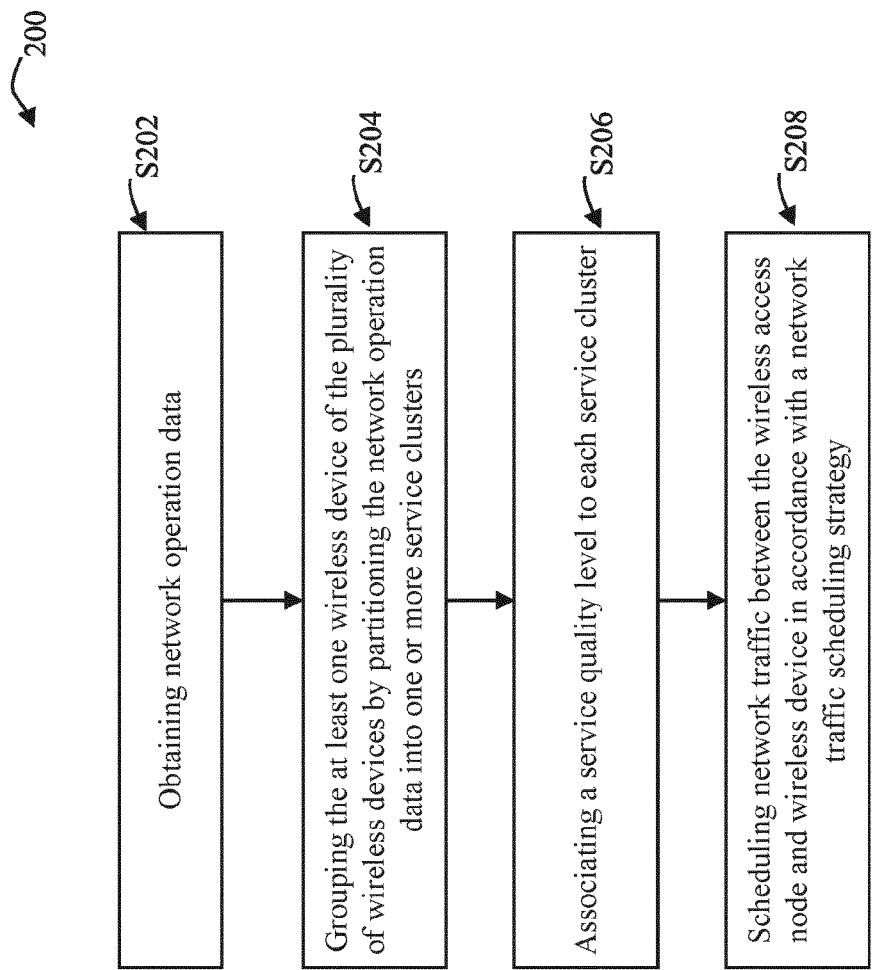
FIG. 2 is a flow chart of an example of a method performed by a network node for controlling traffic in a communications network.

FIG. 2 is a flow chart of an example of a method 200 for controlling traffic in a communications network. The method 200 may be performed in some examples by a network node 110, 120, 320, 330, 720, 750, 800. In particular, the method may be performed in some examples by processing circuitry 804 of the network node 800, such as a base-band unit, BBU 720. The method 200 may also be performed, in some examples, by a virtual node such as virtual BBU. The method 200 may further be performed by a computer code of a computer program when executed by the processing circuitry 804. The communications network 300, 700 in some examples may be a wireless communications network such as Fourth-Generation, 4G or Fifth-Generation, 5G cellular network. The communications network comprises a wireless access node, such as gNB, adapted to serve a plurality of wireless devices, such as UE.

The method 200 may comprise, in step S202, obtaining network operation data 410 for at least one of the plurality of wireless devices. The network operation data 410 may comprise location 410a of the respective wireless device and performance data 410b. The network operation data 410 is preferably indicative of a plurality of attributes corresponding to the operation of the respective wireless device in the communications network. In particular, obtaining network operation data 410 may comprise, in some examples, receiving network operation data 410 at the wireless access node, the network operation data 410 being transmitted directly from at least one of the wireless devices. In another example, obtaining network operation data 410 may comprise receiving the network operation data 410 at the Fifth-Generation Core Network, 5GCN node, from the at least one UE via the gNB, at the. In another example, obtaining network operation data 410 may comprise receiving network operation data 410 at the 5GCN node from the wireless access node, such as gNB.

The network operation data 410 may be a set of observations or samples of parameters corresponding to the operation of the communication network. Each observation may be a vector of N dimensions, where N corresponds to a number of parameters being included in the network operation data. The vectors may be generated at the wireless access node using parameters collected from core network, UE, and/or wireless access node itself to populate the vector. The location 410a of the respective wireless device may be represented as a latitude and longitude tuple. The location data 410a may be calculated at the UE, using Global Navigation Satellite System, GNSS receiver for example. In another example, the location data 410a may be obtained by approximating the location of the at least one wireless device based on an elevation and azimuth of a radio beam transmitted towards the respective wireless device from the wireless access node.

Figure 3:
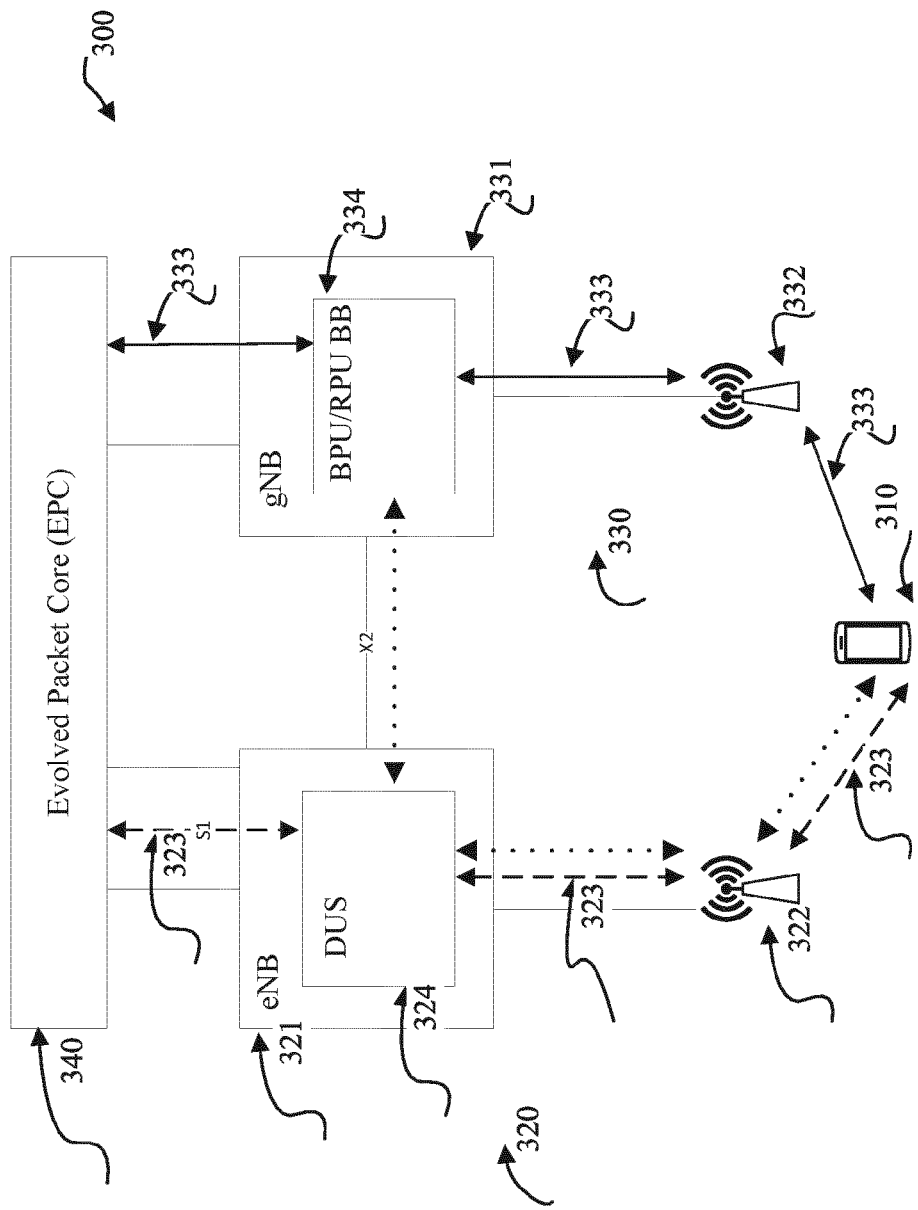
FIG. 3 is a block diagram illustrating another example of a communications network.

FIG. 3 shows a block diagram which illustrates an example communications network 300, such as a 5G mobile network 300, in which the location data 410a may be obtained by approximating the location of the at least one wireless device 310 based on a first signal 323 and second signal 333 received by the respective wireless device 310, wherein the first signal 323 and second signal 333 each originate at separate wireless access nodes 320, 330. The UE 310 in this situation may be operating in Dual Connectivity/Split Architecture mode whereby two wireless access nodes 320, 330, a first wireless access node 320 and a second wireless access node 330 are simultaneously connected with the UE 310 via the air interface. The first wireless access node 320 may comprise eNB 321 and first radio interface 322. The second wireless access node 330 may comprise gNB 331 and second radio interface 332. A control plane, CP 323 signal, carrying control information facilitating management of the UE 310 connectivity in the network, may in this case be communicated between the UE 310 and Evolved Packet Core, EPC 340. Between the EPC 340 and Distributed Unit, DU 324 of the eNB 321, the CP signal 323 may be transmitted via 51 interface. Using the first radio interface 322, the CP signal 323 is then transmitted to and from the UE 310. A data plane, DP 333 signal, carrying data, may also be communicated between the EPC 340 and UE 310. The DP 333 signal may be communicated between the EPC 340 and the Radio Processing Unit, RPU 334 or Baseband Processing Unit, BPU 334 of the gNB 331. The DP signal 333 may be then communicated to or from the UE 310 via the second radio interface 332. In this example, UE 310 is receiving two signals 323 and 333 from different directions and different wireless access nodes 320, 330. A location of the UE 310 may be then estimated by measuring the power of the received radio signals 323 and 333, for example by calculating and comparing Received Radio Signal Strength Indicator, RSSI, which is a is a measurement of the power present in a radio signal received by the UE 310, or by comparing Reference Signal Received Power, RSRP.

The location data 410a may also be obtained with involvement of Mobility Management Entity, MME in case of 4G networks, or Access and Mobility Management function, AMF, in case of 5G networks, using UE positioning, such as network-assisted GNSS mechanism, downlink positioning and enhanced Cell ID mechanisms.

In step S202, obtaining network operation data 410 may further comprise obtaining performance data 410b. The performance data 410b may comprise wireless device-specific data, for example strength of a radio signal received by the UE, represented by RSSI 412. RSSI data 412 may ne communicated to the wireless access node via Radio Resource Control, RRC protocol. The performance data 410b may further comprise energy data 413 indicating energy or battery consumption of the wireless device. The performance data 410b may further comprise data throughput 416 between the wireless device and wireless access node. The data throughput 416 may be measured both uplink, UL or downlink, DL and may be measured in bits per second, for example.

The performance data 410b may also comprise wireless access node-specific data. This data may include a number 415 of wireless devices being served by the wireless access node. The data 410b may also include energy consumption data 414 indicative of energy consumption of the wireless access node.

Figure 4:
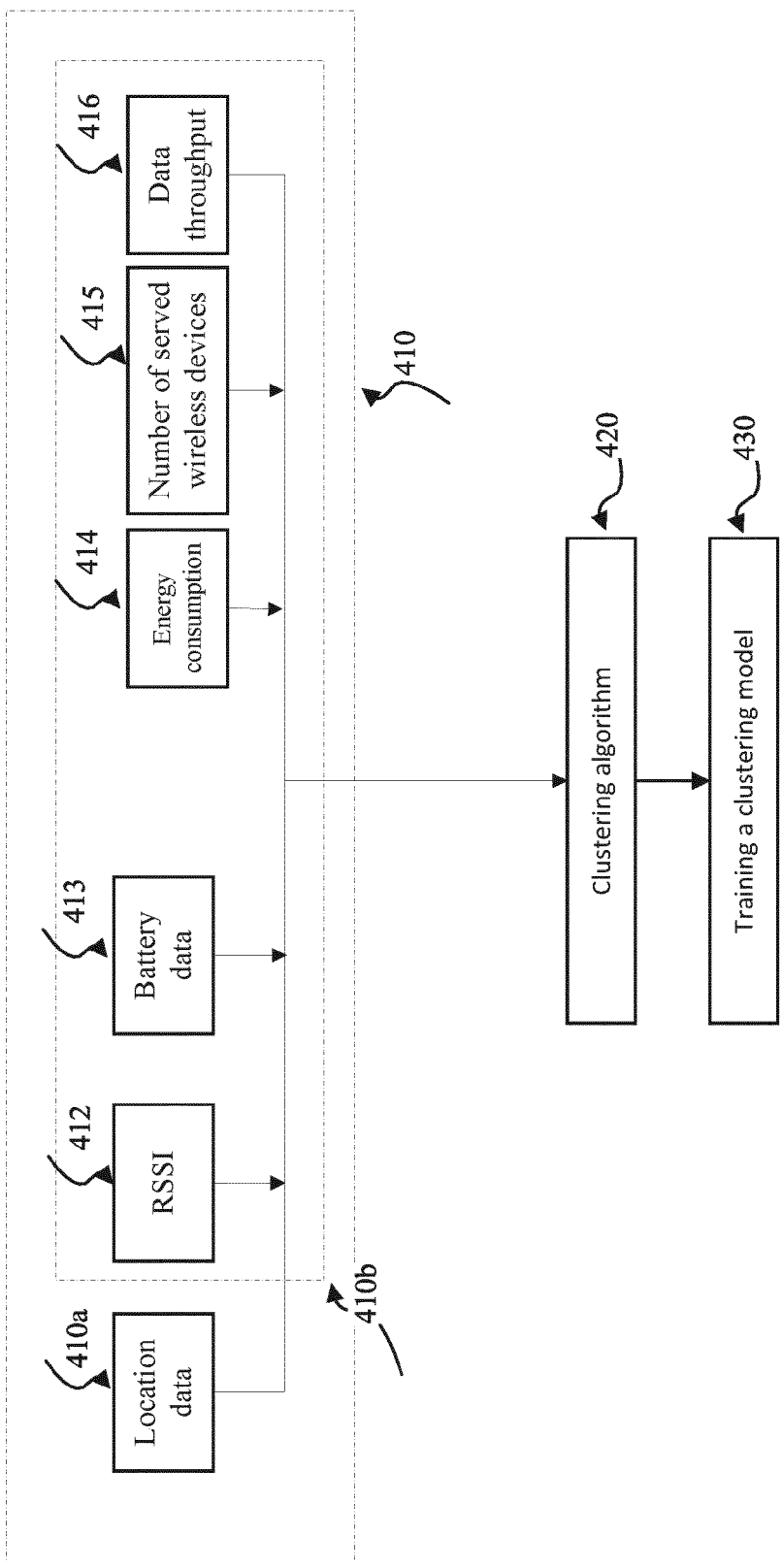
FIG. 4 is a flow chart illustrating some example steps of a method performed by a network node for controlling traffic in a communications network.

The method 200 may further comprise, in step S204, grouping the at least one wireless device of the plurality of wireless devices by partitioning the network operation data 410 into one or more service clusters 510, 520, 530, 540 wherein each service cluster 510, 520, 530, 540 includes a number of data samples of network operation data 410 that show similarity across multiple dimensions, and wherein each service cluster defines a geographical area. The network operation data 410, which may comprise a set of observations as explained above, may be inputted into a clustering algorithm 420, such as K-means algorithm, which is an example of unsupervised machine learning technique. This step is further illustrated in FIGS. 4 and 5. Based on the input 410, K-means algorithm can build or train a model 430. The input into the algorithm 420 may be a set of observations $X=\{x_1, \ldots, x_n\}$. In some examples, every observation may be a 3-dimensional vector, having as a first parameter the location of the observation, for instance a latitude and longitude tuple, or a set of latitude and longitude tuples indicating a geographical zone or area. Another parameter in the vector may be the observed signal strength, for example an RSSI or RSRP measurement or an average of RSSI or RSRP measurements from the bounded location. Another parameter in the vector may be average throughput both in UL direction and DL direction.

In order to determine a number of clusters in the dataset, the Elbow method can be used. The Elbow method calculates the percentage variance or the rate of change of clusters as a function of the number of clusters. The minimum number of clusters that does not cause a major change, is selected as the number of clusters of choice or the number of service clusters. The set of service clusters, "S" is therefore $\{S_1, \ldots, S_k\}$ where k is the number of service clusters.

The K-means clustering algorithm will therefore take X, S as input, and produce k clusters of all observations in X. Initially, K-means, or "centroids", may be generated randomly. Subsequently, each observation in X may be associated with one of k means, by calculating the Euclidean distance of each observation with each of the k means, and mapping the observation to the mean with minimum Euclidean distance. The means are then recalculated and become the "new" mean. Then, associating observations and recalculating the means are repeated until the algorithm converges. The K-means algorithm may run periodically, for example every day or week or month, or can be triggered by an external entity, for example by Network Operations Centre, NOC.

Figure 5:
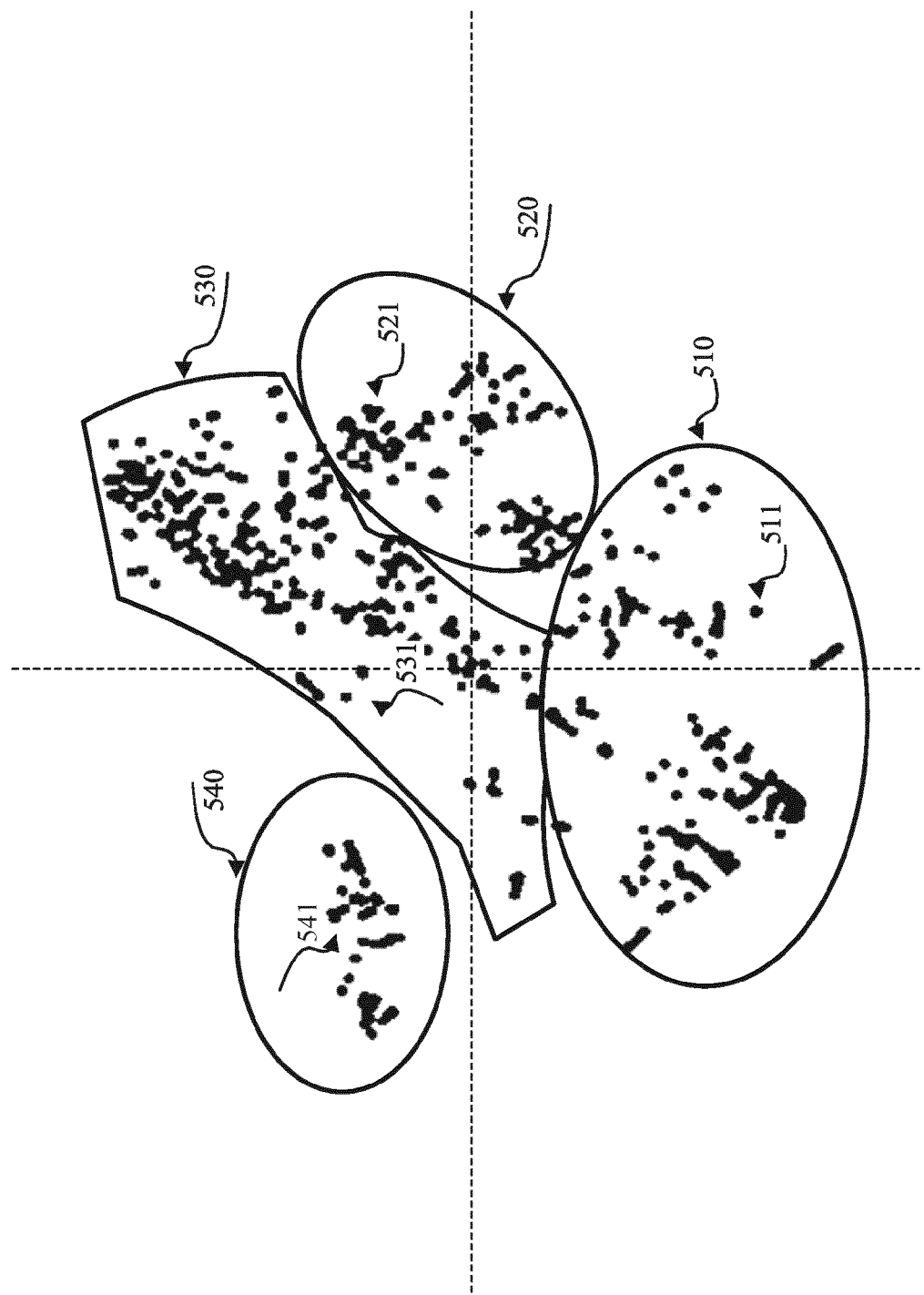
FIG. 5 is a schematic of example service clusters obtained by performing a method of FIG. 2.

FIG. 5 illustrates an example set of service clusters 510, 520, 530, 540, each covering a set of samples or observations 511, 521, 531, 541 of the network operation data 410. The resulting partitioning into the service clusters 510, 520, 530, 540 can be obtained using K-means algorithm 420, for example. Each service cluster covers a respective set of observations. As each observation includes location data of the wireless device, the service clusters 510, 520, 530, 540 each correspond to a geographical area 510, 520, 530, 540 having a boundary which links the outermost observations in the service cluster in such a way that each observation within the respective cluster is covered by the geographical area. In this way, the wireless devices being served by a wireless access node can be grouped.

The method 200 may further comprise, in step S206, associating a service quality level to each service cluster 510, 520, 530, 540. The service quality level can be indicative of interference experienced by the wireless devices belonging to the respective service cluster. The service quality level can be a set of metrics which may correspond to the overall QoS or QoE experienced by the wireless devices covered by respective service cluster. For example, a first data throughput range and first RSSI range can be predefined for the wireless devices to indicate "high" interference. When a vector of the mean of any of the service clusters indicates that the values of throughput and RSSI parameters fall within the first throughput range and first RSSI range, respectively, then that cluster can be labelled as "high" interference cluster. Correspondingly, second throughput range and second RSSI range can be defined to indicate "low" interference. In this situation, if throughput and RSSI parameters of the mean vector of any of the service clusters fall within the respective second throughput range and second RSSI range, then the service cluster may be labelled as "low" interference cluster. Depending on the type of parameters in the observations or the type of network operation data being clustered, different labels for the clusters can be envisaged, which corresponds to grouping the wireless devices according to different service quality metrics. For example, multiple labels and corresponding parameters may be defined. In some examples, service clusters may include wireless devices for which both battery energy consumption and wireless access node energy consumption are below a predetermined threshold.

The method 200 may further comprise, in step S208, scheduling network traffic between the wireless access node and at least one wireless device depending on the location of the at least one wireless device relative to the one or more service clusters 510, 520, 530, 540. Having information on the service clusters 510, 520, 530, 540, into which the wireless devices are partitioned may also allow for a set of rules intended to trigger appropriate network actions with respect to network traffic, considering the effect of the movement of the wireless devices relative to the service clusters 510, 520, 530, 540. Scheduling network traffic between the wireless access node and at least one wireless device may be performed based on a decision tree model which organises the set of rules in a tree-like structure. The decision tree model may be obtained by training a decision tree function using a second machine learning algorithm based on the network operation data and the one or more service clusters. Scheduling network traffic between the wireless access node and at least one wireless device may also be performed in accordance with a network traffic scheduling strategy dependent on the location of the at least one wireless device relative to the one or more service clusters 510, 520, 530, 540. The network traffic scheduling strategy may be indicative of the service quality level prioritised for the communications network. For example, the network operator may define the strategy which optimises a selected service quality level for the communications network. The strategy may optimise power consumption for example. The strategy may also optimise data throughput for the wireless devices for example. In any example, the strategy may organise the network traffic between the wireless devices and the serving wireless access node so as to obtain the result expected by the network operator.

Figure 6:
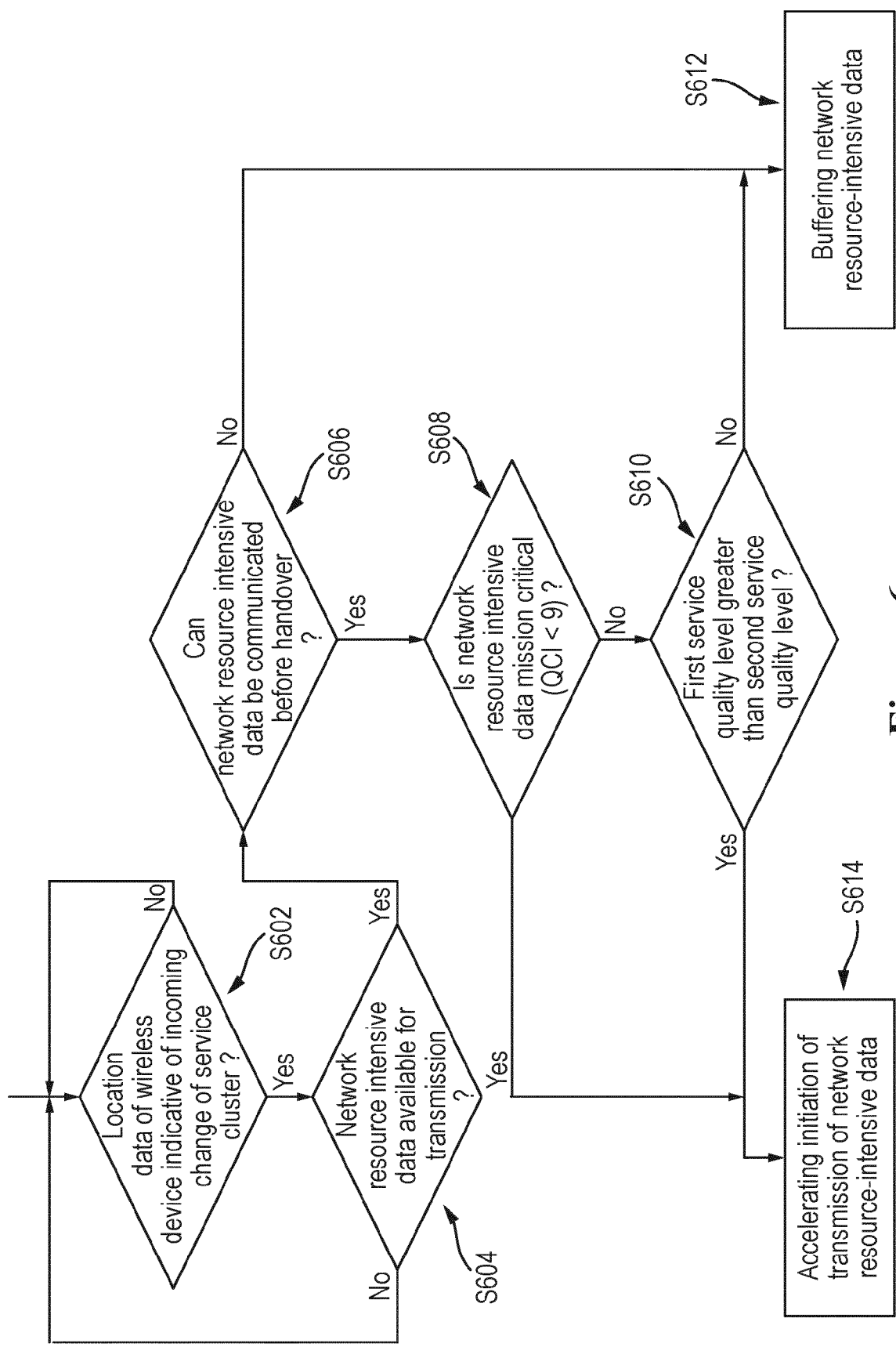
FIG. 6 is a flow chart illustrating an example network traffic scheduling strategy.

FIG. 6 illustrates an example of a network traffic scheduling. In step S602, a location of a wireless device is monitored, by for example periodically performing UE positioning or by obtaining UE location directly from the device. The mobility pattern may be recorded or analysed in real-time and may be indicative of a movement within the boundaries of a service cluster. The mobility pattern may also be indicative of an upcoming change of service cluster from a geographical location perspective i.e. indicating that UE approaches an edge of the current service cluster. If the indication is that no service cluster change is probable, then there are no further actions. Alternatively, if the mobility pattern indicates an upcoming change of cluster, then, in step S604, a check is made whether there is data, such as network resource intensive data, available for transmission. The network resource-intensive data may include for example high-definition HD video data, latency-sensitive data such as real time video or audio calls etc. The information on the availability of data for transmission can be provided by the UE, or by using a regression model, where it can be estimated based on the previous traffic flow patterns for the respective UE. Availability information concerns data available either for UL or DL transmission, that is data from the wireless access node to the wireless device, or from the wireless device to the wireless access node. If there is no data to transmit in step S604, there is no action to perform. If there is data available for transmission, then, in step S606, a determination is made whether network resource intensive data can be communicated before a handover of the wireless device to another cell. In some examples, handover information can by obtained directly by using mobility models for calculating location, velocity and direction of movement of the UE, or indirectly by counting the number of handovers a UE performs as unit of time. When the handover information indicates that network resource intensive data cannot be communicated before handover occurs, then the network traffic scheduling proceeds to step S612, in which the network resource intensive data is buffered and transmission of it is deferred. When step S606 indicates that the network resource intensive data may be safely communicated before handover occurs, then the scheduling proceeds to the step S608, where a determination is made whether the network data or network resource intensive data is mission critical. This data includes emergency data such as emergency calls or broadcasts, for example. The communications network may also maintain custom definitions of data which is classified as mission critical. Another example of indication of criticality of data available for transmission is Quality Class Identifier, QCI. This parameter may be set for the current Packet Data Network, PDN connectivity sessions of the UE. For example, QCI value of 9 may mean that network traffic is not critical, or best-effort, whereas QCI value of 2 or 3 may mean that the network traffic is on a prioritized bearer. Values of QCI can be retrieved from the core network, for example from the Policy Control Resource Function, PCRF node for a given UE. If QCI is lower than 9, then this indicates that the data is critical and should be received and/or transmitted as soon as possible. In such a case, the scheduling proceeds to step S614 where an initiation of transmission of data is accelerated. Alternatively, when the data for transmission is categorised as non-critical data, the step S610 is performed. In this step, when the UE is in a first service cluster, and is about to move to the second service cluster, the service quality levels of both clusters are compared. For example, when a first service cluster is "low" interference cluster and second service cluster is "high" interference cluster", then step S614 is performed by accelerating initiation of transmission of data, so that network resource intensive data is communicated when the UE is still in the better performing cluster. Advantageously, this results in maintaining QoS by maximising likelihood of successful transmission of data. Another advantage is reducing energy consumption in the network by avoiding excess radio signal transmission power increases both at the UE side and wireless access point side.

Figure 7:
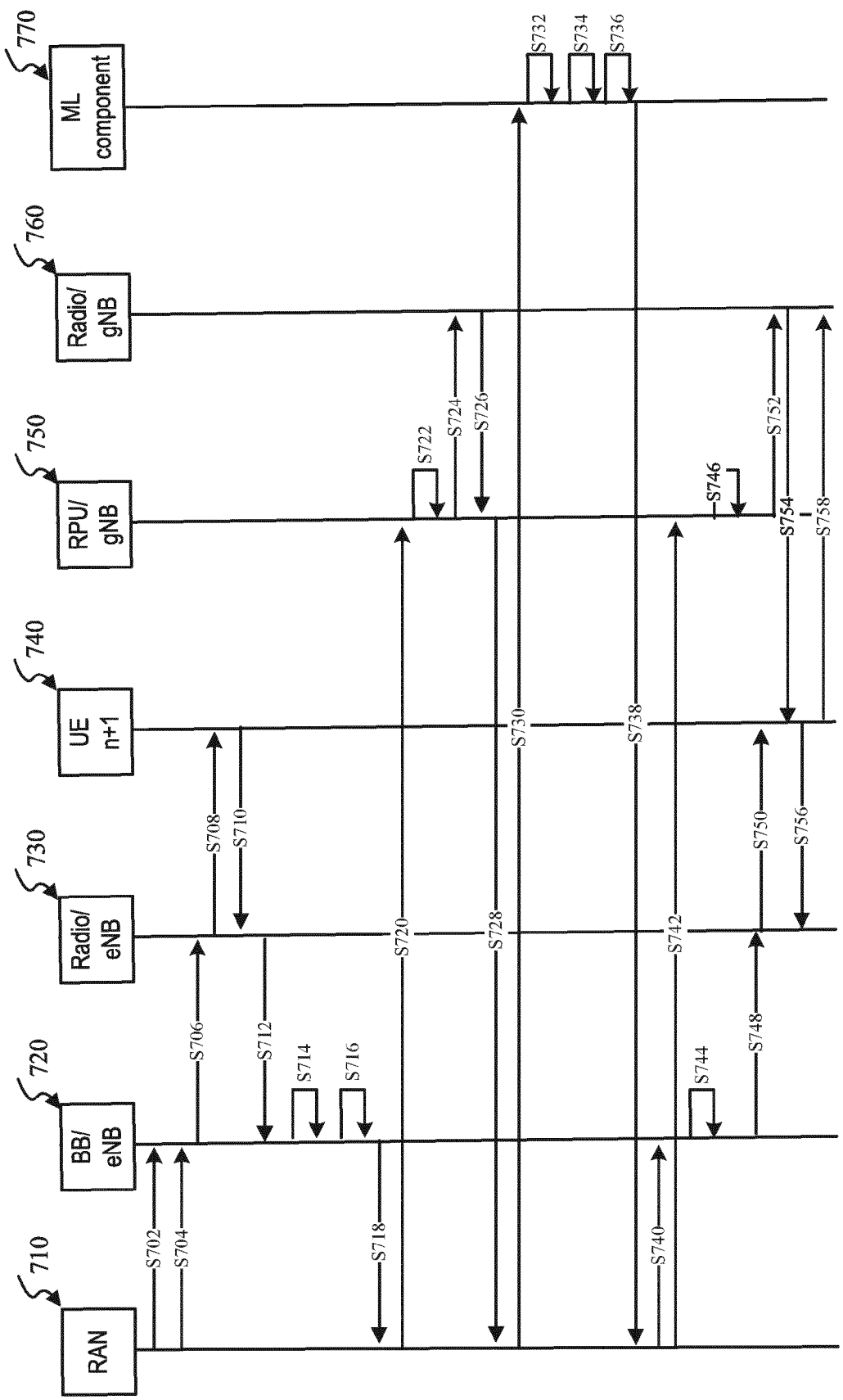
FIG. 7 is a message sequence chart illustrating an example of communications in a communications network.

FIG. 7 shows an example of communications in a network 700, for example during a particular example implementation of a method for controlling traffic. In step S702, the Radio Access Network, RAN 710 may send information about handover of a specific UE 740 to the baseband unit, BBU 720 of the eNB which may be a first wireless access node that is serving the UE 740. UE n+1 is emphasises that there may be more than one UE that participates in the process. In step S704, RAN 710 informs the BBU 720 of eNB that there is network traffic data available to transmit between the UE and the wireless access node. The eNB radio interface 730 is then provided, in step S706, with the data to transmit to the UE 740, together with instructions to measure power usage, interference, and position or location of the UE 740. The data together with the instructions of step S706 are then sent to the UE in step S708, which in turn responds, in step S710, by sending back to the eNB radio interface 730 control information such as Channel State Information Reference Signal, CSI-RS which is used by the UE to estimate the channel and report channel quality information, CQI to the eNB, and radio signal information such as RSSI measured at the UE 740. The collected data from step S710 is then fed back to the BBU 720 of the eNB as part of step S712, and processed thereby in step S714. The process defined by steps S702 to S712 may be performed repetitively.

In step S716, the BBU 720 of the eNB is tasked with identifying high interference zones. The BBU 720 of the eNB then sends, in step S718, a control plane, CP signal to the RAN 710 in order to request information from the neighbouring site, which may be a second wireless access point. The RAN 710 instructs, in step S720, Radio Processing Unit, RPU 750 of the second wireless access point, gNB, to gather information on specific UE 740. When the RPU 750 of gNB has processed that request in step S722, a control signal is then sent, in step S724, to the gNB radio interface 760 which replies, in step S726, with information on measured interference and battery power usage based on the calculated location of the UE 740. Then, the RPU 750 of the gNB, in step S728, forwards the collected data back to the RAN 710. The process defined by steps S716 to S728 can be performed repetitively.

In step S730, the RAN 730 sends the collected data to the machine learning, ML component 770, which may be the clustering function such as K-means algorithm described earlier. In step S732, the ML component 770 designates service clusters based on gathered set of samples of data collected from the previous steps. The ML component 770 may designate, in step S734, service clusters suitable for data transmission and service clusters suitable for voice transmission. In some examples, service clusters for voice transmission may correspond to the network traffic scheduling strategy which allows only mission critical traffic in these clusters, due to high interference levels present in the service cluster. Service cluster for data transmission may correspond to low interference service cluster which can accommodate network resource intensive data or traffic without a substantial increase in interference in the service cluster. In step S736, ML component 770 may assign multiple service quality levels so as to obtain multiple service clusters pertaining to different characteristic of the service quality. For example, a service cluster may be created including wireless devices which exhibit low battery consumption. A different service cluster may be created including wireless devices which exhibit high data throughout and so on. Different network traffic scheduling strategies can then be crated and used which allow complex handling of network traffic based on defined priorities, goals or policies. The information on the created service clusters is then made available, in step S738, to the RAN 710. Steps S730 to S738 may be performed periodically, for example every day, week or month, or can be triggered by an external entity, for example by NOC.

In step S740, the information on different service clusters is propagated from RAN 710 to BBU 720 of eNB, and, in step S742, from RAN 710 to the RPU 750 of gNB. BBU 720 of eNB and RPU 750 of gNB then store the received data on service clusters locally, in steps S744 and S746 respectively. Steps S740 to S746 may be performed repetitively in accordance with particular requirements and configuration of the communications network.

In steps S748 to S758, an example network traffic scheduling strategy is illustrated. In step S748, as a result of the UE 740 being located in a service cluster which is assigned a high interference service quality level, the BBU 720 of eNB, in cooperation with eNB radio interface 730 decides to buffer data available for transmission between the UE 740 and eNB. When the UE 740 changes location which indicates a change of the current service cluster to a service cluster assigned a low interference service quality level, then the eNB radio interface 730, in step S750, decides to accelerate transmission of data available for transmission between UE 740 and eNB. A similar process may be performed when gNB is considered, which is illustrated by steps S752 and S754. The UE 740 may then feed back, in steps S756 and S758, the information to the eNB or gNB which may then be used to recompute or update the service clusters, for example.

Figure 8:
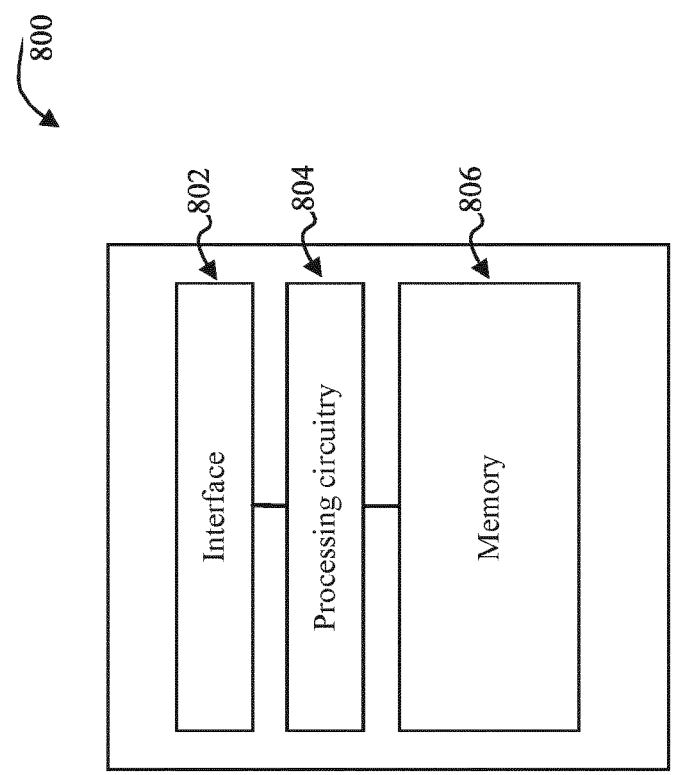
FIG. 8 is a schematic of an example of network node of a communications network.

FIG. 8 is a schematic of an example of network node 800 of a communication network. The network node 800 may, in some embodiments, be an electronic device that can be communicatively connected to other electronic devices on the network (e.g., other network devices, UEs, radio base stations, etc.). In certain embodiments, network node 800 may include radio access features that provide wireless radio network access to other electronic devices (for example a "radio access network device" may refer to such a network device) such as UEs. For example, network node 800 may be a base station, such as gNodeB in 5G, eNodeB in Long Term Evolution, LTE, NodeB in Wideband Code Division Multiple Access, WCDMA or other types of base stations, as well as a Radio Network Controller, RNC, a Base Station Controller, BSC, or other types of control nodes. As depicted in FIG. 8, the example network node 800 comprises processing circuitry or processor 804, memory 806, interface 802, and may also comprise antenna. These components may work together to provide various network device functionality as disclosed herein.

Processing circuitry 804 may be a microprocessor, controller, microcontroller, central processing unit, digital signal processor, application specific integrated circuit, field programmable gate array, any other type of electronic circuitry, or any combination of one or more of the preceding. The processor 804 may comprise one or more processor cores. In particular embodiments, some or all of the functionality described herein as being provided by network node 800 may be implemented by processor 804 executing software instructions, either alone or in conjunction with other network node 800 components, such as memory 806.

Memory 806 may store code (which is composed of software instructions and which is sometimes referred to as computer program code or a computer program) and/or data using non-transitory machine-readable (e.g., computer-readable) media, such as machine-readable storage media (e.g., magnetic disks, optical disks, solid state drives, read only memory (ROM), flash memory devices, phase change memory) and machine-readable transmission media (e.g., electrical, optical, radio, acoustical or other form of propagated signals—such as carrier waves, infrared signals). For instance, memory 806 may comprise non-volatile memory containing code to be executed by processor 804. Where memory 806 is non-volatile, the code and/or data stored therein can persist even when the network device is turned off (when power is removed). In some instances, while network node 800 is turned on that part of the code that is to be executed by the processor(s) 804 may be copied from non-volatile memory into volatile memory (e.g., dynamic random access memory, DRAM, static random access memory, SRAM) of network node 800.

Interface 802 may be used in the wired and/or wireless communication of signaling and/or data to or from network node 800. For example, interface 802 may perform any formatting, coding, or translating to allow network node 800 to send and receive data whether over a wired and/or a wireless connection. In some embodiments, interface 802 may comprise radio circuitry capable of receiving data from other devices in the network over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, interface 802 may comprise network interface controller(s), NICs, also known as a network interface card, network adapter, local area network, LAN adapter or physical network interface. The NIC(s) may facilitate in connecting the network node 800 to other devices allowing them to communicate via wire through plugging in a cable to a physical port connected to a NIC. As explained above, in particular embodiments, processor 804 may represent part of interface 802, and some or all of the functionality described as being provided by interface X103 may be provided more specifically by processor 804.

The components of network node 800 are each depicted as separate boxes located within a single larger box for reasons of simplicity in describing certain aspects and features of network node 800 disclosed herein. In practice however, one or more of the components illustrated in the example network node 800 may comprise multiple different physical elements (e.g., interface 802 may comprise terminals for coupling wires for a wired connection and a radio transceiver for a wireless connection).

While the modules are illustrated as being implemented in software stored in memory 806, other embodiments implement part or all of each of these modules in hardware.

The network node 800 may comprise a wireless access node 800. In some examples, the network node may comprise a Baseband Unit, BBU 800, or E-nodeB, eNB, or Next Generation node-B, gNB. In another example, the network node 800 may comprise a virtual node 800 such as virtual BBU 800.

BBU 730 may be a unit that processes baseband in communications systems. A wireless access node may comprise the BBU and a radio frequency, RF processing unit or remote radio unit, RRU. The BBU may be placed in the equipment room and connected with RRU via optical fiber. The BBU may be responsible for communication through the physical interface 802, for example.

A BBU in a cellular telephone cell site may comprise a digital signal processor, DSP to process forward voice signals for transmission to a mobile unit and to process reverse voice signals received from the mobile unit.

Although the interface 802, processing circuitry 804 and memory 806 are shown connected in series, these may alternatively be interconnected in any other way, for example via a bus.

In one example, the memory 806, which may comprise a non-transitory computer-readable medium 806, contains instructions, such as a computer program, executable by the processing circuitry 804 such that the network node 800 is operable to obtain network operation data for at least one of the plurality of wireless devices, the network operation data comprising location of the respective wireless device and performance data correlated with the location, the network operation data being indicative of a plurality of attributes corresponding to the operation of the respective wireless device in the communications network. The processing circuitry 804 further causes the network node 800 to group the at least one wireless device of the plurality of wireless devices by partitioning the network operation data into one or more service clusters wherein each service cluster defines a geographical area based on the obtained location. The processing circuitry 804 further causes the network node 800 to schedule network traffic between the wireless access node and at least one wireless device depending on the location of the at least one wireless device relative to the one or more service clusters.

In some examples, the network node 800, or BBU/RPU 720, 750 of the network node 800 may be operable to associate a service quality level to the one or more of service clusters. The service quality level may be indicative of interference or energy consumption experienced by the wireless devices belonging to the respective service cluster or by wireless access node(s) serving wireless devices belonging to the respective service cluster. In some examples, the BBU or RPU 720, 750 of the network node 800 may be operable to schedule network traffic between the wireless access node and at least one wireless device in accordance with a network traffic scheduling strategy indicative of the service quality level prioritised for the communications network. The network traffic scheduling strategy may be generated or stored in the BBU or RPU 720, 750 or may be generated in a core network and uploaded to the BBU or RPU, for example. The one or more service clusters 510, 520, 530, 540 may include data samples of the network operation data 410 that show similarity across multiple dimensions The data samples may be obtained or collected by the BBU or RPU 720, 750 from the wireless devices. The data samples may also be received by the virtual BBU in a core network, wherein the data samples have been forwarded to the virtual BBU from the eNB or gNB operable to partition the network operation data into one or more service clusters by training a clustering function using a first machine learning algorithm based on the network operation data. The performance data 410b may comprise at least one of: received radio signal quality data 412, such as RSSI or RSRP measured at the respective wireless device and transmitted to the network node 800 by means of RRC protocol for example, data throughput 416 and battery data 413 indicative of energy consumption of the respective wireless device. The performance data 410b may further comprise at least one of: a number of wireless devices being served by the wireless access node and energy consumption data indicative of energy consumption of the wireless access node. In some examples, the network node 800, and in particular BBU or RPU 720,750 of the network node 800 may be operable to schedule network traffic between the wireless access node and at least one wireless device by training a decision tree function using a second machine learning algorithm based on the network operation data 410 and the one or more service clusters 510, 520, 530, 540. In some examples, the network node 800, or BBU/RPU 720, 750 of the network node 800, may be operable to schedule network traffic, such as transmission of voice/data, between the wireless access node and at least one wireless device by accelerating initiation of transmission of network resource-intensive data, when the at least one wireless device belongs to a first service cluster of a first service quality level, for example low interference cluster, low power consumption cluster, high throughput cluster. In some examples, scheduling traffic may comprise buffering network resource-intensive data, for example at the BBU/RPU 720, 750 when the at least one wireless device belongs to a second service cluster of a second service quality level, for example a high interference cluster, high power consumption cluster or low throughput cluster; and wherein the first service quality level is greater than the second service quality level. When the at least one wireless device belongs to the second service cluster, the network node 800 or BBU/RPU of the network node 800 for example, may prioritise mission-critical network traffic. In some examples, when a wireless device belongs to a low service quality level cluster, the BBU/RPU 720, 750 may buffer and withhold transmission of network resource intensive data, with an exception of mission-critical traffic such as emergency calls or messages, for example.

The network node 320, 330, 720, 750 may be operable to obtain the location of the at least one wireless device by approximating the location of the at least one wireless device based on a first signal, such as control plane reference signal and second signal such as data plane reference signal received by the respective wireless device, wherein the first signal and second signal each originate at separate wireless access nodes 320, 330, 720, 750. In other examples, the network node 800 may be operable to obtain the location of the at least one wireless device by approximating the location of the at least one wireless device based on an elevation and azimuth of a radio beam transmitted towards the respective wireless device from the wireless access node.

Figure 9:
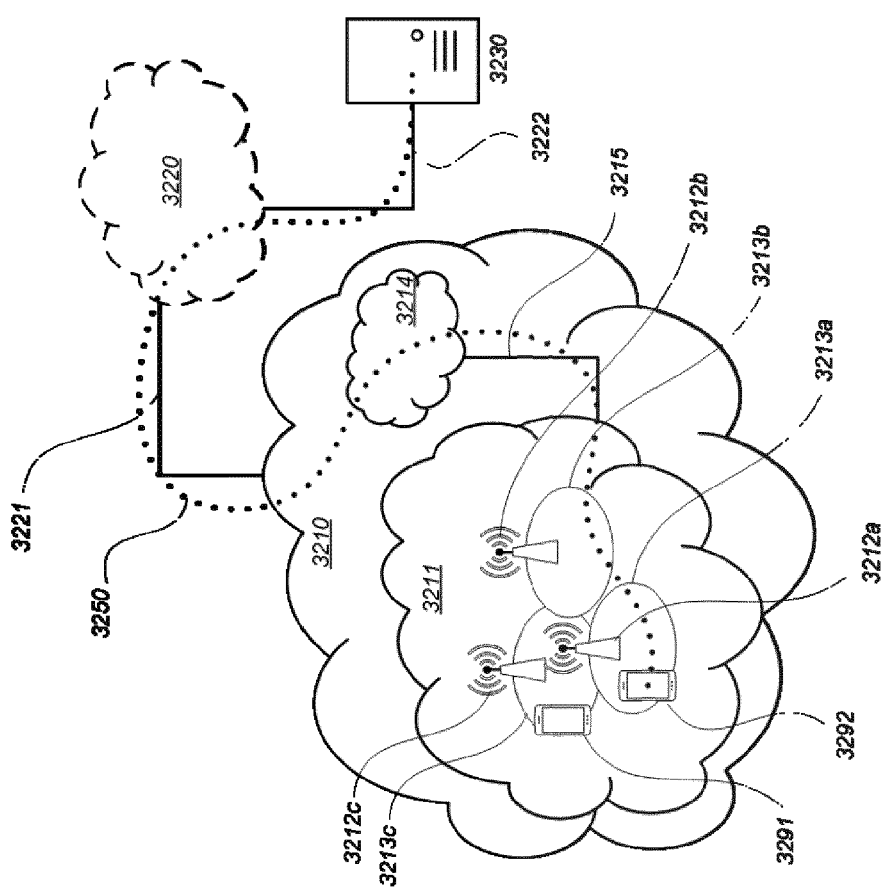
FIG. 9 schematically illustrates a telecommunication network connected via an intermediate network to a host computer.

With reference to FIG. 9, in accordance with an example, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points or nodes, such as network nodes 110, 120, 320, 330, 720, 750, 800, each defining a corresponding coverage area 3213a, 3213b, 3213c. Each base station 3212a, 3212b, 3212c is connectable to the core network 3214 over a wired or wireless connection 3215. A first wireless device or UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 9 as a whole enables connectivity between one of the connected wireless devices or UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212, such a network node 800 or wireless access node, may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 10. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 10) served by the base station 3320. The communication interface 3326 may be configured to facilitate a connection 3360 to the host computer 3310. The connection 3360 may be direct or it may pass through a core network (not shown in FIG. 10) of the telecommunication system and/or through one or more intermediate networks outside the telecommunication system.

In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 10:
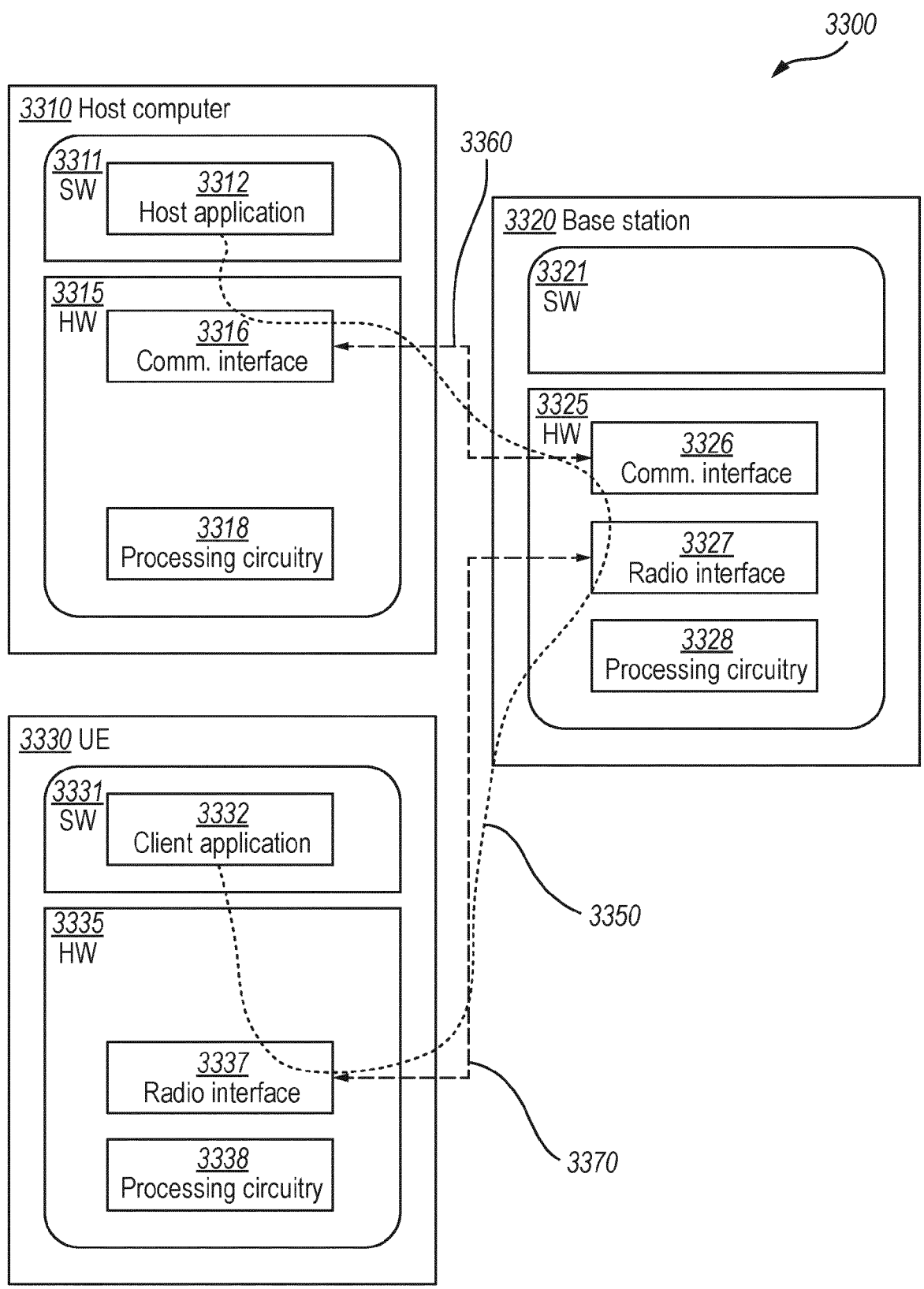
FIG. 10 is a generalized block diagram of a host computer communicating via a base station with a user equipment over a partially wireless connection.

It is noted that the host computer 3310, base station 3320 and UE 3330 illustrated in FIG. 10 may be identical to the host computer 3230, one of the base stations 3212a, 3212b, 3212c and one of the UEs 3291, 3292 of FIG. 9, respectively. This is to say, the inner workings of these entities may be as shown in FIG. 10 and independently, the surrounding network topology may be that of FIG. 9.

In FIG. 10, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as reduced user waiting time, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 11, 12:
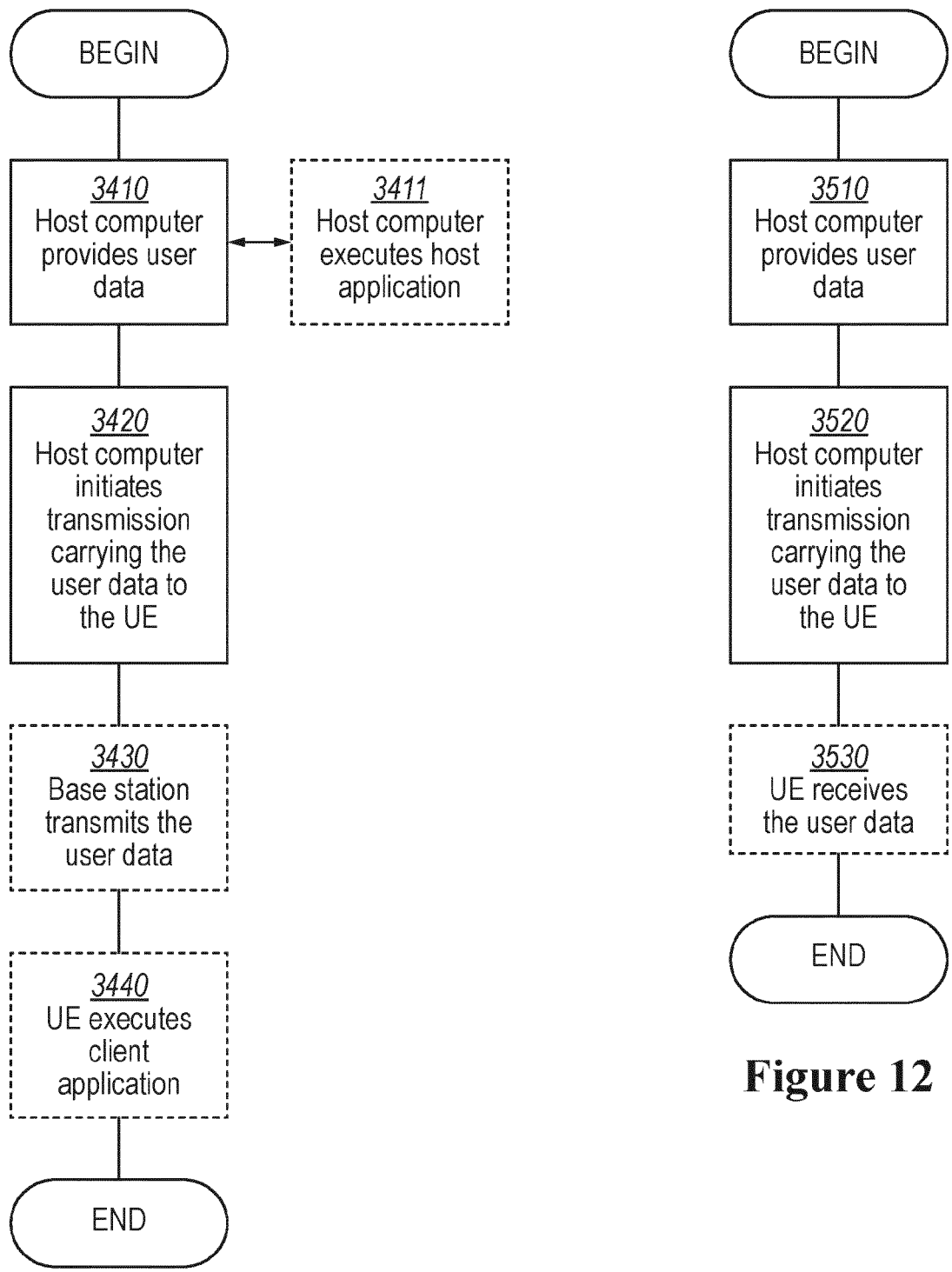
FIGS. 11 and 12 are flowcharts illustrating methods implemented in a communication system including a host computer, a base station and a user equipment.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method performed by a network node for controlling traffic in a communications network, the communications network comprising a wireless access node adapted to serve a plurality of wireless devices, the method comprising the steps of:

obtaining network operation data for at least one of the plurality of wireless devices, the network operation data comprising location of the respective wireless device and performance data correlated with the location, the network operation data being indicative of a plurality of attributes corresponding to operation of the respective wireless device in the communications network, the network operation data comprising hand-over data indicative of a likelihood of hand-over of the at least one wireless device;

grouping the at least one wireless device of the plurality of wireless devices by partitioning the network operation data into one or more service clusters, wherein each service cluster defines a geographical area based on the obtained location;

based on the location of the at least one wireless device relative to the one or more service clusters, scheduling network traffic between the wireless access node and at least one wireless device when the hand-over data indicates a likely hand-over for the respective wireless device by:

determining whether network traffic to be transmitted before the handover of the wireless device to another cell is mission critical, when network traffic is determined to be mission critical, accelerating initiation of transmission of the network data, or when network traffic is determined not to be mission critical, buffering network data.

2. A network node of a communication network, the communications network comprising a wireless access node adapted to serve a plurality of wireless devices, the network node comprising processing circuitry and a memory containing instructions executable by the processing circuitry, whereby the network node is operable to:
obtain network operation data for at least one of the plurality of wireless devices, the network operation data comprising location of the respective wireless device and performance data correlated with the location, the network operation data being indicative of a plurality of attributes corresponding to operation of the respective wireless device in the communications network, the network operation data comprising hand-over data indicative of a likelihood of hand-over of the at least one wireless device,
group the at least one wireless device of the plurality of wireless devices by partitioning the network operation data into one or more service clusters wherein each service cluster defines a geographical area based on the obtained location;
based on the location of the at least one wireless device relative to the one or more service clusters, schedule network traffic between the wireless access node and at least one wireless device when the hand-over data indicates a likely hand-over for the respective wireless device by:
determining whether network traffic to be transmitted before the handover of the wireless device to another cell is mission critical,
when network traffic is determined to be mission critical, accelerating initiation of transmission of the network data, or
when network traffic is determined not to be mission critical, buffering network data.

3. A network node according to claim 2, further operable to associate a service quality level to the one or more of service clusters.

4. A network node according to claim 3, wherein the service quality level is indicative of interference experienced by the wireless devices belonging to the respective service cluster.

5. A network node according to claim 3, operable to schedule network traffic between the wireless access node and at least one wireless device in accordance with a network traffic scheduling strategy indicative of the service quality level prioritized for the communications network.

6. A network node according to claim 2, wherein the one or more service clusters includes data samples of the network operation data that show similarity across multiple dimensions.

7. A network node according to claim 6, operable to partition the network operation data into one or more service clusters by training a clustering function using a first machine learning algorithm based on the network operation data.

8. A network node according to claim 2, wherein the performance data comprises at least one of: received radio signal quality data measured at the respective wireless device, data throughput and battery data indicative of energy consumption of the respective wireless device.

9. A network node according to claim 2, wherein the performance data further comprises at least one of: a number of wireless devices being served by the wireless access node and energy consumption data indicative of energy consumption of the wireless access node.

10. A network node according to claim 2, operable to schedule network traffic between the wireless access node and at least one wireless device by training a decision tree function using a second machine learning algorithm based on the network operation data and the one or more service clusters.

11. A network node according to claim 3, operable to schedule network traffic between the wireless access node and at least one wireless device by:
accelerating initiation of transmission of network resource-intensive data when the at least one wireless device belongs to a first service cluster of a first service quality level;
buffering network resource-intensive data when the at least one wireless device belongs to a second service cluster of a second service quality level; and
wherein the first service quality level is greater than the second service quality level.

12. A network node according to claim 11, operable to obtain a quality class identifier, QCI, for the at least one wireless device, wherein the mission critical traffic is determined based on the value of the QCI.

13. A network node according to claim 2, operable to obtain the location of the at least one wireless device by approximating the location of the at least one wireless device based on a first signal and second signal received by the respective wireless device, wherein the first signal and second signal each originate at separate wireless access nodes.

14. A network node according to claim 2, operable to obtain the location of the at least one wireless device by calculating location using a GNSS receiver of the at least one wireless device.

15. A network node according to claim 2, operable to obtain the location of the at least one wireless device by approximating the location of the at least one wireless device based on an elevation and azimuth of a radio beam transmitted towards the respective wireless device from the wireless access node.

16. A network node according to claim 2, wherein the network node is a wireless access node.

17. A non-transitory computer readable medium comprising a computer program for controlling traffic in a communications network, the computer program comprising computer code which, when run on processing circuitry of a network node, causes the network node to:
obtain network operation data for at least one of the plurality of wireless devices, the network operation data comprising location of the respective wireless device and performance data correlated with the location, the network operation data being indicative of a plurality of attributes corresponding to operation of the respective wireless device in the communications network, the network operation data comprising hand-over data indicative of a likelihood of hand-over of the at least one wireless device,
group the at least one wireless device of the plurality of wireless devices by partitioning the network operation data into one or more service clusters wherein each service cluster defines a geographical area based on the obtained location;
based on the location of the at least one wireless device relative to the one or more service clusters, schedule network traffic between the wireless access node and at least one wireless device when the hand-over data indicates a likely hand-over for the respective wireless device by:
determining whether network traffic to be transmitted before the handover of the wireless device to another cell is mission critical,
when network traffic is determined to be mission critical, accelerating initiation of transmission of the network data, or
when network traffic is determined not to be mission critical, buffering network data.

\* \* \* \* \*